Aug. 8, 1967  H. LUDWIG  3,334,384
HYDRAULICALLY OPERATED CLAMPING DEVICE FOR A MULTISECTIONAL
MOLD CATCH FOR RECEIVING A JET MOLD PREFERABLY
FOR THE MANUFACTURE OF FOOTWEAR
Filed July 6, 1964  2 Sheets-Sheet 1
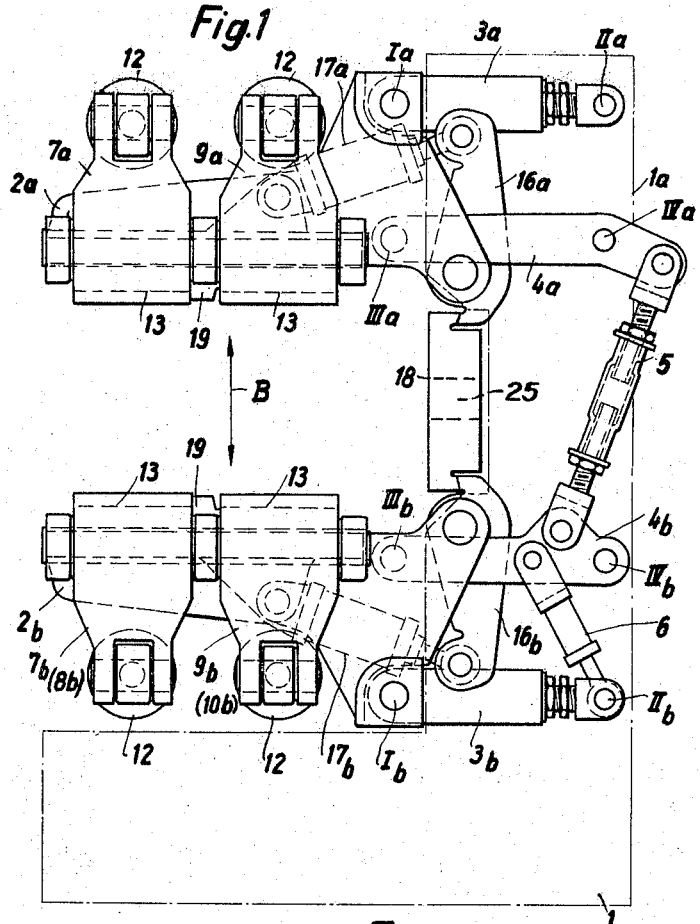
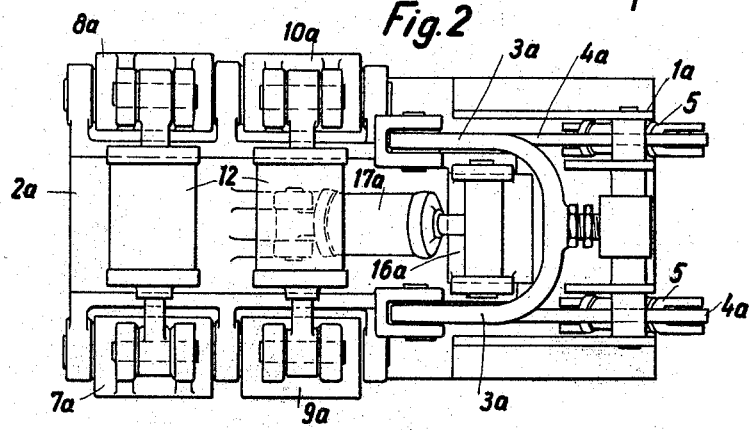
Inventor:
H. Ludwig
BY
Richards & Geier
ATTORNEYS

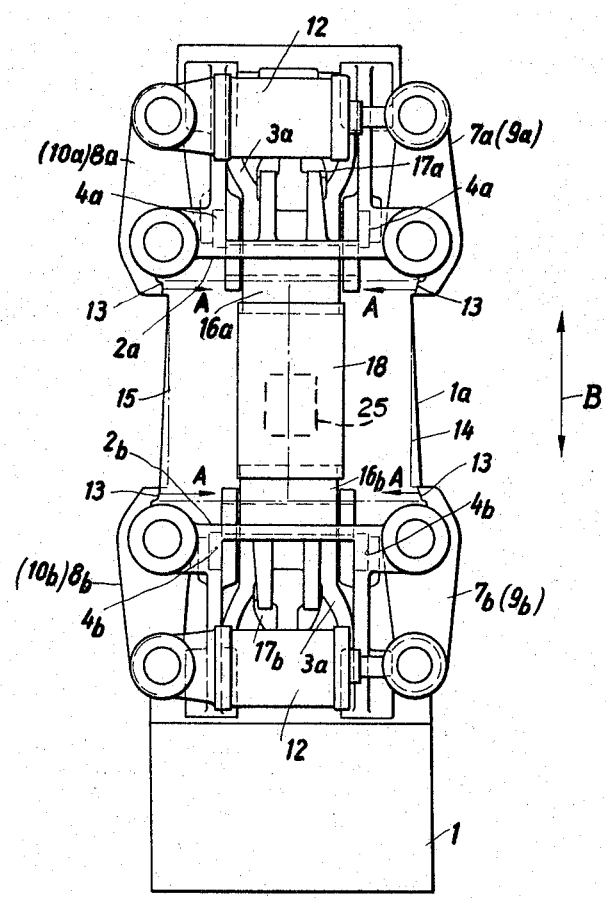

3,334,384
HYDRAULICALLY OPERATED CLAMPING DEVICE FOR A MULTISECTIONAL MOLD CATCH FOR RECEIVING A JET MOLD PREFERABLY FOR THE MANUFACTURE OF FOOTWEAR
Herbert Ludwig, Desmastr. 112, Usen, near Bremen, Germany
Filed July 6, 1964, Ser. No. 380,460
Claims priority, application Germany, July 5, 1963, L 45,271
6 Claims. (Cl. 18—43)

The present invention relates to a hydraulically operated clamping device for a multisectional mold catch or carrier for receiving a jet mold for the manufacture of items of any kind from plastic, rubber, or other materials capable of being molded by injection, and preferably for the manufacture of footwear, such clamping device producing a high mold closing pressure.

Jet molds generally comprise several parts received by a mold catch having two or still more parts, such mold catch being used for closing the mold, around a core if applicable, and for holding it in closed condition, by a certain pressure. For instance, a known type of mold for the manufacture of footwear of plastic materials comprises a core (last), two side pieces, and a bottom die, whilst the corresponding mold carrier consists of two side pieces having hinged connections between them and a cover also hinge-connected to one of the said mold carrier side pieces and having a suitable locking mechanism for connection to the other side part or piece.

The purpose of such arrangement is that the jet mold parts are pressed together in a well sealing manner, but in many cases the closing pressure or the sealing efficiency between the adjacent edges of the connected mold parts is insufficient for safely avoiding the forcing out of the injected mass through the mold part connections so that the casting removed from the mold must be machined for finishing.

For this reason, it has already been suggested to apply an additional pressure to the outside of the closed mold catch by the use of hydraulically operated clamping devices in such a manner that, if automatic manufacturing cycles are concerned, a clamping device is placed onto the mold catch arriving at the injection molding machine by means of the rotary table, and that the clamping device is then pressed against the said mold catch, before the following injection molding operation is initiated. In this way it is indeed possible to produce a very high closing pressure being sufficient for satisfactory sealing which pressure cannot be produced by the mold alone, but, using the known devices requiring troublesome handling and the movement of large masses, the sequence of working cycles of the machine and consequently the output are unnecessarily retarded and reduced.

The object of the pesent invention is an improved hydraulically operated clamping device to be used for the mentioned purpose above all featured as follows: provision is made for supporting members which can be approached to the mold catch from various sides and which have several hydraulically operated pairs of clamping or gripping jaws being of such design that they can receive between them the side pieces of the mold catch or carrier. A preferred model of such improved clamping device comprises two plate-shaped supporting members hinge-connected to the frame by means of parallelogram type connecting rods, said supporting members having several levers being hinge-connected to the plate edges and arranged in a manner that each two opposite levers form a pair of clamping or gripping jaws and can be closed and opened by at least one common hydraulic cylinder.

An advantageous arrangement is that the holders of the clamping jaws can be applied to opposite sides of the mold catch or carrier and that, to this effect, the parallelogram type connecting rods of the two plates are connected to each other in an opposing manner and also connected to a common hydraulic control cylinder, and that, for connection or coupling of the said connecting rods, a bar is used which is preferably changeable in length and acts on one connecting rod each of the two plates on opposite sides of the fulcrum points which bar is arranged that its longitudinal axis passes tangentially to the turning circles of the action or attack points. In this way, it is possible to apply the required clamping pressures to the mold catch, simultaneously at several points, by carrying out short movements and by moving small masses so that the injection molding operations are retarded or interrupted during very short periods only.

In this connection, and in accordance with a preferred embodiment of the invention, it will be advantageous that the direction of the clamping movement of the pairs of clamping jaws is perpendicular with respect to the direction of opening, or closing, respectively, of the holding or supporting members. When making such arrangement, it will for instance become possible to provide a plurality of mold catches on a rotary table which carries or approaches them to an injection molding machine, one after another and in accordance with the working rhythm, and to pass through the individual mold catches between the component parts of the hydraulically operated clamping device, when the holders 2a, 2b are opened and the rotary table continues moving.

For fixedly clamping a mold catch carried into its working position, the only thing to do is to displace through a short stroke the holders 2a, 2b, in closing directions B. As a result of such displacement, the pairs of clamping jaws 7a . . . 10a, or 7b . . . 10b, respectively, are applied to the side parts 14, 15 of the mold catch for clamping it in their clamping direction (arrow A) with direction is perpendicular with respect to the direction of opening, or closing, respectively (double arrow B) of the holders 2a, 2b.

The described arrangement offers the further special advantage if the manufacture of footwear is concerned that the mold catch or carrier and consequently the mold can be located in the space on the rotary table in such a manner that the foot of the last is in vertical position whereby the heel can be at the top and the point of the shoe at the bottom. If the foot is in vertical position, first the removal of the ready item is easier and more convenient when compared to a horizontal arrangement. Ssecond: if the foot is in vertical position, the leg of the last has a greater moment of resistance than it is the case with a horizontally arranged foot. This feature is especially efficient in the manufacture of large and heavy-quality high boots. Thus, the risk of an unintentional displacement of the last will in the case of a vertically arranged foot be by far smaller than it would be with a horizontal foot.

In a further development of the present invention, a swiveling pressing lever is hinge-connected to the end of each holder with the swiveling direction transversal to the lever pairs, such pressing lever being subjected to the action of a hydraulic cylinder acting on the other end of the holder, in such a manner that both levers can press a pressing plate against the cover of the mold catch. Moreover, the pressure plate having an opening for the passage of the injection molding head is held in an easily replaceable manner in a slide guide for which provision is made on the frame so that, in the case of a contamination by the molding mass of the plate or its opening respectively, there will be no longer interruptions of service.

One embodiment of the invention is shown in the drawing where:

FIG. 1 is a side elevation of the device.

FIG. 2 is a top view of the device as shown in FIG. 1.

FIG. 3 is a front elevation of the device as shown in FIG. 1 with the side pieces of a mold catch shown by dash-dotted lines.

Upright 1a of frame 1 carries an upper plate-shaped supporting member 2a which is held by means of two connecting rods 3a and two connecting rods 4a, and a lower plate-shaped supporting member 2b which is held by means of two connecting rods 3b and two connecting rods 4b, which lower supporting member is essentially symmetrical to the upper member, and the arrangement is such that the fulcrum points I, II, III, IV form a parallelogram and that the connecting rods or plate-shaped supporting elements are movable parallel to each other and remain parallel to each other or horizontal, respectively, irrespective of the wanted or actually occupied position. For adjustment of the parallelism of the supporting members 2a, 2b, the connecting rods 3a, 3b, can be changed in length.

Moreover, the connecting rods 4a and 4b are coupled by means of two bars 5 which act from the fulcrum points IVa and IVb, at equal distances but from different sides. In this way, the supporting members are forced to move in an opposing manner so that when the supporting member 2a is moving downwards, the supporting member 2b is moving upwards, and vice versa. For making adjustment, provision is made for a hydraulic cylinder 6 acting on the connecting rod, on the one hand, and on the frame, on the other hand, In order to obtain control travels of equal length in upward direction and in downward direction, the arrangement has been made in such a manner that, when the supporting members 2a, 2b are in one of their initial or basic positions, for instance, in their closing position, the longitudinal axis of bar 5 passes tangentially to the swiveling circles of the fulcrum points IVa and IVb as it is shown in FIG. 1. A further advantage of such arrangement is that the weights of the two supporting members 2a, 2b are practically balanced by each other so that their movement can be produced in a very easy manner and only the frictional resistance must be overcome.

Each of the supporting members 2a and 2b has four hinge-connected clamping levers 7a, 8a, 9a, 10a, and 7b, 8b, 9b, 10b. The levers two of which form a pair and are arranged opposite to each other are unequally armed double levers. A hydraulic cylinder 12 is acting between the long arms of each pair of levers whereas the short arms have bevelled faces 13 which, when the device is in closing position, will be matching with corresponding bevelled faces of the two side pieces 14 and 15 (see FIG. 3) of the mold catch.

In the case of the illustrated embodiment of the invention each supporting member 2a and 2b is at its inner end equipped with a further double lever 16a, or 16b, respectively, which, as a result of a hydraulic cylinder 17a, or 17b, respectively, acting on the supporting members, on the one hand, and on the long lever arms, on the other hand, will apply a closing pressure on a pressure plate 18 whilst the short lever arms of the two levers 16a and 16b act with their bevelled faces on the corresponding bevelled faces at the opposite ends of the pressure plate 18.

The purpose of the pressure plate is to join against a cover of the mold catch when same is being clamped. The pressure plate has an opening 25 for access of the injection molding head to the mouthpiece of the cover. To this effect, the pressure plate when in rest position is elastically held against fixed stops and, when clamping, the plate is forced against the mold catch cover, away from the said stops and against the spring force.

The movement required for transition into working position is very small. The mentioned back stops are parts of a guiding appliance from which the pressure plate can be drawn off. In this way, the plate can easily and quickly be replaced if it has been contaminated during operation by slabbering molding mass.

The force exerted by the pressure plate 18 on the cover of the mold catch is received by the supporting elements 2a, 2b, through the clamping levers 7a . . . 10a, 7b . . . 10b, and/or abutments 19 having preferably conical contact faces matching with projecting lugs of the mold catches.

I claim:

1. A hydraulically operated clamping device for the multisectional mold catch for receiving a jet mold preferably for the manufacture of footwear, wherein a high closure pressure is produced, said mold catch having side pieces and a cover, said clamping device comprising two spaced plate-shaped supporting members, a plurality of pairs of clamping jaws carried by said supporting members and located opposite each other and hydraulic means actuating said supporting members and said clamping jaws for closing said jaws over said side pieces of the mold catch, wherein said hyddraulic means move said supporting members toward and away from each other and move said clamping jaws in a direction perpendicular to the movement of the supporting members.

2. A device as described in claim 1, comprising a frame, rods, pivots engaging said rods and forming a parallelogram for hingedly connecting each plate-shaped supporting member to said frame, said clamping jaws having the shape of levers and being hingedly connected to opposite edges of said plate-shaped supporting members, whereby two opposed jaws form a pair of clamping jaws, and wherein said hydraulic means comprise at least one hydraulic cylinder for actuating pairs of clamping jaws.

3. A device as described in claim 2, comprising means connected to said rods for swinging said supporting members in opposite directions, and wherein said hydraulic means comprise a hydraulic control cylinder connected to one of said rods.

4. A device as described in claim 3 characterized in that the means swinging the supporting members comprise bars of variable length, each bar being pivotally connected to two rods connected to different supporting members at opposite sides of pivots connecting said two rods to said frame, said bars extending tangentially to said pivots.

5. A device as described in claim 4, comprising pressure levers connected to ends of separate supporting members and swingable transversely to the movement of said jaws, and a pressure plate engaged by said levers, said hydraulic means comprising hydraulic cylinders actuating said levers to force said pressure plate against the cover of the mold catch.

6. A device as described in claim 5 characterized in that the pressure plate has a passage opening for the injection jet mold, said frame having a slide guide for said pressure plate.

References Cited
UNITED STATES PATENTS

| | | | |
|---|---|---|---|
| 2,568,905 | 9/1951 | Wiehsner | 269—25 X |
| 3,110,061 | 11/1963 | Hardy | 18—30 |
| 3,139,302 | 6/1964 | Orloff et al. | 294—88 |

J. SPENCER OVERHOLSER, *Primary Examiner.*

E. MAR, *Assistant Examiner.*